(12) United States Patent
Tonelli

(10) Patent No.: US 11,665,506 B2
(45) Date of Patent: May 30, 2023

(54) SYSTEM, SOFTWARE APPLICATION AND METHOD OF ADVANCED INTERACTION WITH TRANSPORTABLE CONTAINERS

(71) Applicant: G.T. LINE S.R.L., Valsamoggia (IT)

(72) Inventor: Massimo Tonelli, Bologna (IT)

(73) Assignee: G.T. LINE S.R.L., Valsamoggia (IT)

( * ) Notice: Subject to any disclaimer, the term of this patent is extended or adjusted under 35 U.S.C. 154(b) by 0 days.

(21) Appl. No.: 16/971,401

(22) PCT Filed: Mar. 2, 2018

(86) PCT No.: PCT/IT2018/000029
§ 371 (c)(1),
(2) Date: Aug. 20, 2020

(87) PCT Pub. No.: WO2019/167090
PCT Pub. Date: Sep. 6, 2019

(65) Prior Publication Data
US 2020/0396567 A1    Dec. 17, 2020

(51) Int. Cl.
*G08B 1/08*      (2006.01)
*H04W 4/029*   (2018.01)
(Continued)

(52) U.S. Cl.
CPC ............. *H04W 4/029* (2018.02); *A45C 13/18* (2013.01); *A45C 13/42* (2013.01); *H04W 4/80* (2018.02)

(58) Field of Classification Search
None
See application file for complete search history.

(56) References Cited

U.S. PATENT DOCUMENTS

| 2007/0011041 A1 | 1/2007 | Bourne | |
| 2011/0148625 A1* | 6/2011 | Velusamy | H04W 4/029 340/539.13 |

(Continued)

FOREIGN PATENT DOCUMENTS

| CN | 105831993 A | 8/2016 |
| CN | 106723838 A | 5/2017 |

(Continued)

OTHER PUBLICATIONS

International Search Report dated Nov. 27, 2018 re: Application No. PCT/IT2018/000029, pp. 1-4, US 2011/0148625 A1, CN 206 805 208 U, JP 2004 155518 A and FR 3 033 235 A1.

(Continued)

*Primary Examiner* — Gary Lafontant
(74) *Attorney, Agent, or Firm* — Cantor Colburn LLP

(57) ABSTRACT

A system of advanced interaction with transportable containers, such as suitcases, trolleys, trunks, backpacks, crates, or the like, includes transportable containers, each of which is equipped with a respective transponder which carries at least one corresponding identification code. Each transponder allows polling by a contactless information transmission technology, such as RFID or NFC, for communication at least of the corresponding identification code.
The system also includes a remote processing unit, suitable for the management of a central data bank, which contains information related to the transportable containers and to their association with the corresponding identification codes.

14 Claims, 2 Drawing Sheets

(51) Int. Cl.
*H04W 4/80* (2018.01)
*A45C 13/18* (2006.01)
*A45C 13/42* (2006.01)

(56) References Cited

U.S. PATENT DOCUMENTS

2015/0028997 A1  1/2015  Phillips et al.
2016/0314667 A1  10/2016  Bang-Olsen

FOREIGN PATENT DOCUMENTS

CN   106726600 A   5/2017
CN   206805208 U   12/2017
FR      3033235 A   9/2016
JP    2004155518 A   6/2004

OTHER PUBLICATIONS

Written Opinion dated Nov. 27, 2018 re: Application No. PCT/IT2018/000029, pp. 1-7, US 2011/0148625 A1, CN 206 805 208 U, JP 2004 155518 A and FR 3 033 235 A1.
CN Office Action dated Aug. 9, 2022 re: Application No. 201880090695.3, pp. 1-26, citing: US2011148625A1, CN105831993A, CN106723838A, FR3033235A1 and CN105831993A.
Chinese Office Action for Chinese Application No. 201880090695, dated Jan. 19, 2023, 14 pages.
European Office Action for European Application No. 18730131.2, dated Mar. 6, 2023, 6 pages.

\* cited by examiner

SYSTEM, SOFTWARE APPLICATION AND METHOD OF ADVANCED INTERACTION WITH TRANSPORTABLE CONTAINERS

TECHNICAL FIELD

The present disclosure relates to a system, a software application and a method of advanced interaction with transportable containers, such as suitcases, trolleys, trunks, backpacks, crates, or the like.

BACKGROUND

As is known, the broad commodity category of transportable containers includes trunks, crates, suitcases, trolleys, backpacks and other products, which differ in shape, dimensions, materials and/or functionality, as well as in their intended use, the type of goods that can be transported and/or the reference customers.

Over time, manufacturing companies have in fact diversified and improved their offer, so as to meet the requirements of increasingly attentive and demanding customers.

For example, it is possible to find on the market suitcases or other containers which are distinguished by their mechanical properties (impact resistance, light weight, choice of materials, etc.), by the wealth of accessories and equipment, by the presence of pockets and retention elements (for the tidy accommodation of tools and equipment), et cetera.

However, containers of the known type do not facilitate adequately the exchange of information with the manufacturing company, as instead it would be useful for a plurality of requirements.

Indeed the information related to the properties and performance of high-resistance containers, as well as the indications related to the tests that they have passed and the qualitative standards that they meet, are often very important for the user but are (only partially) reported in the manuals and documents that accompany the packaging and in any case can be lost easily and are anyway difficult to find later on.

Likewise, in order to communicate with the company in case of damage or malfunctions, the user usually has available a support service which employs centers located on the territory (for the more organized companies) and/or toll-free numbers where it is possible to contact personnel which is often not adequately qualified. These are in any case awkward solutions which anyway require a considerable expenditure of time of the user to track and contact the designated party.

Another drawback of transportable containers of the known type is observed in professional use, i.e., when tools, instruments and equipment of various kinds, which the user can use once he has reached the site of intervention or work, are stored in them.

The containers in fact do not facilitate in any way the tracking of professional activities and/or their reporting, as instead is increasingly important in order to optimize work and/or monitor activity.

A further drawback is linked to the limited effectiveness of the solutions with which known containers are provided in order to try to prevent the risk of loss and/or to activate countermeasures when this event occurs.

SUMMARY

The aim of the present disclosure is to solve the problems described above, providing a system and/or a software application that allows practical methods of information exchange between the user of a container and the manufacturing company.

Within this aim, the disclosure provides a method that allows practical methods of information exchange between the user of a container and the manufacturing company.

The disclosure also provides a system and/or a software application and/or a method of facilitating the gathering and exchange of information related to what is accommodated in a container and to the activities of the user of the container itself.

The disclosure further provides a system and/or a software application and/or a method of facilitating the identification of a specific container and/or of making it easier to find if it is lost.

The disclosure provides a system and/or a software application and/or a method that ensures high reliability in operation.

The disclosure provides a system and/or a software application that adopts a technical and structural architecture that is alternative to those of systems of the known type.

The disclosure also provides a system and/or a software application and/or method that can be obtained/provided easily starting from commonly commercially available elements and materials.

The disclosure further proposes a system and/or a software application and/or a method that have modest costs and are safe in application.

This aim and these and other advantages which will become better apparent hereinafter are achieved by providing a system according to claim 1, by a software application according to claim 14 and by a method according to claim 15.

BRIEF DESCRIPTION OF THE DRAWINGS

Further characteristics and advantages of the disclosure will become better apparent from the description of a preferred but not exclusive embodiment of the system, of the application and of the method according to the disclosure, illustrated by way of nonlimiting example in the accompanying drawings, wherein.

DETAILED DESCRIPTION OF THE DRAWINGS

Figure 1:
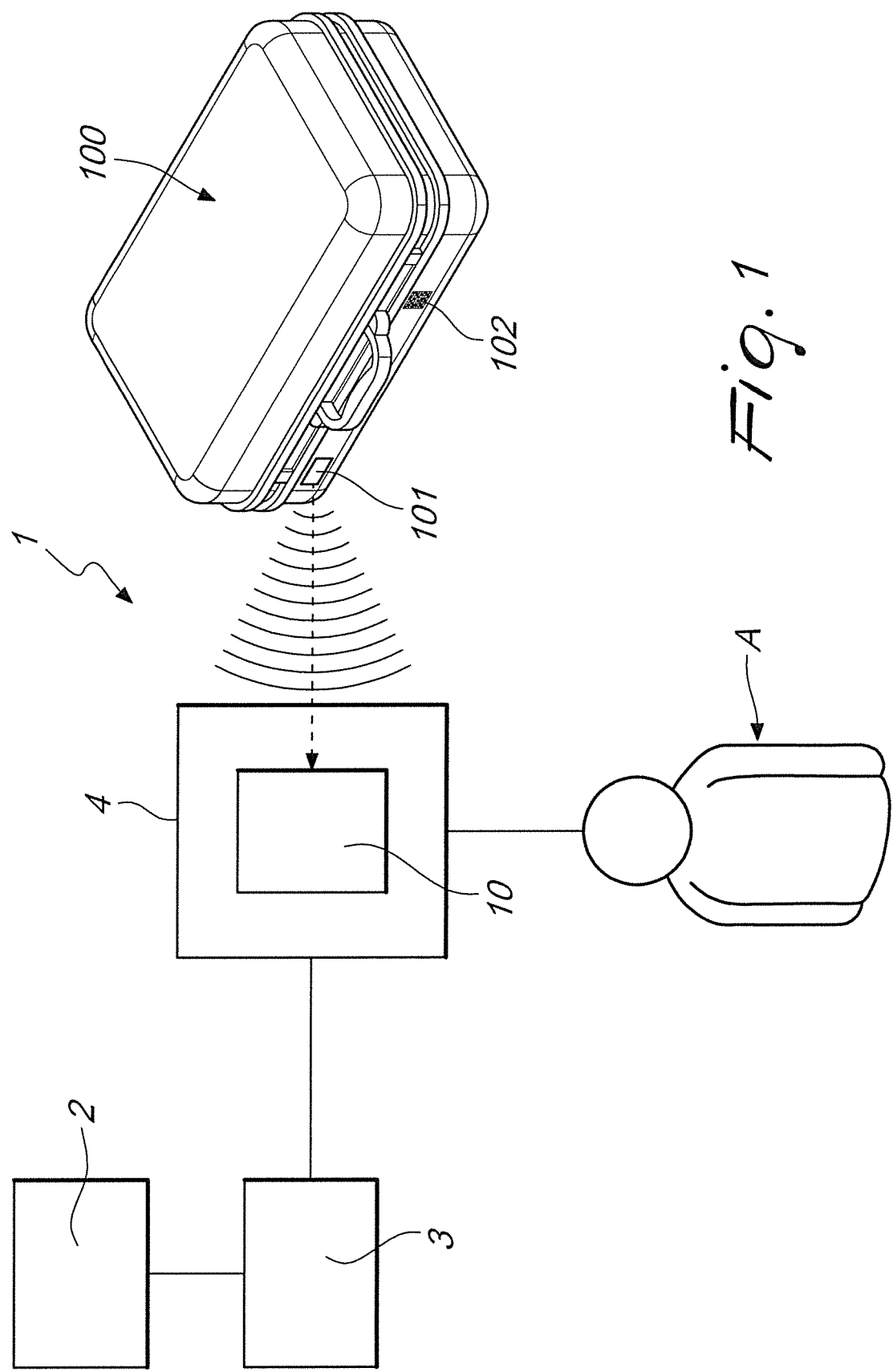
FIG. 1 is a block diagram which illustrates schematically an embodiment of the system according to the disclosure.
Figure 2:
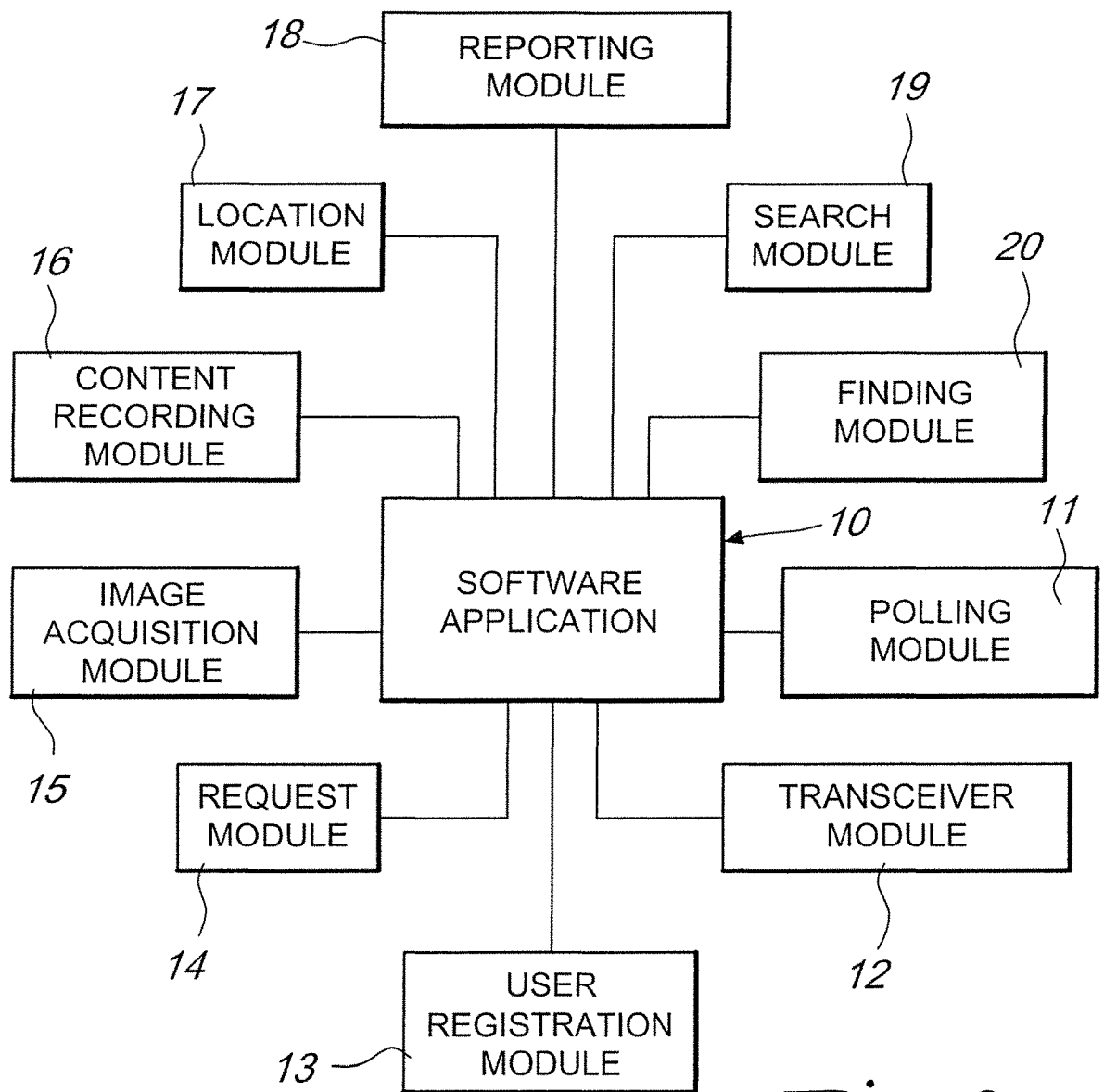
FIG. 2 is a block diagram which illustrates schematically an embodiment of the software application according to the disclosure.
Figure 3:
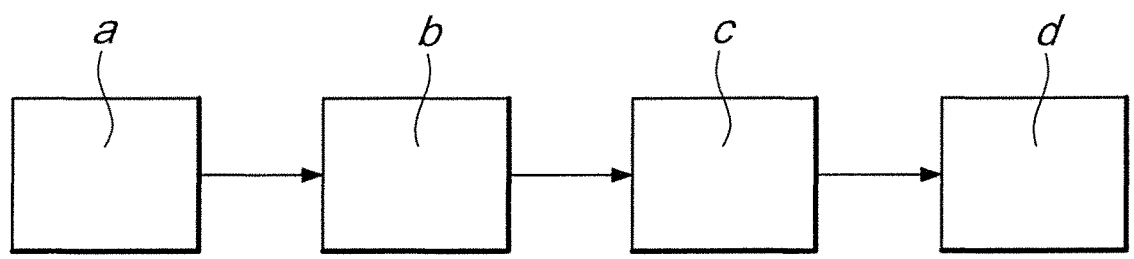
FIG. 3 is a block diagram which illustrates schematically an embodiment of the method according to the disclosure.

With particular reference to FIGS. 1-3, the reference numeral 1 generally designates a system of advanced interaction with transportable containers 100, such as suitcases, trolleys, trunks, backpacks, crates, or the like.

More precisely, it is appropriate to specify right now that any reference that will be made hereinafter to containers 100 is to be understood as extending to any type of transportable product (such as indeed a suitcase, a crate, a trunk, a trolley, a backpack, but also others), capable of accommodating objects of various kinds, both for private use and for professional purposes.

For example, therefore, the container 100 can accommodate tools, instruments, equipment, for professional use, as well as clothing, objects of various types and personal items, for private use.

According to the disclosure, the system 1 comprises first of all a plurality of transportable containers 100, provided and marketed typically but not exclusively by the same manufacturing company (which is interested in providing, by means of the disclosure, a service of advanced interaction with its own products).

As already noted, these containers 100 can be of the various kinds and can be mutually uniform or heterogeneous, in terms of shape, dimensions, material and/or functionalities, as well as in terms of intended use, type of transportable goods and/or reference customers. Each one of them in any case is equipped with a respective transponder 101 (or tag or label) which carries at least one corresponding identification code (and optionally other information on the corresponding container 100, the manufacturing company, or others). Preferably, this identification code must identify uniquely the specific container 100 on which the respective transponder 101 is fitted (which per se is chosen even of a known type), although it is not excluded, more simply, to associate with the same identification code a group of containers 100 which belong for example to the same production batch or are in any case of the same type.

It is useful, moreover, to note that in the accompanying FIG. 1 the transponder 101 is applied externally on one of the half-shells that compose the container 100, but it is not excluded to fix it (in any way) in another point thereof, both externally and internally (or even by embedding it in its walls, or applying it to a tag which is fastened to the container 100).

Each transponder 101 can be polled (even according to per se known methods) by means of a contactless information transmission technology, such as RFID, NFC, or similar technologies, in order to be able to communicate at least the corresponding identification code. The transponder 101 (active or passive) is therefore typically an RFID transponder, an NFC transponder, or the like, although, as will become better apparent hereinafter, in the preferred application it is indeed an NFC transponder.

It is useful, furthermore, to specify that the transponder 101 can also contain other information, in addition to the identification code, which can in any case be transmitted as a consequence of polling according to the chosen technology.

Furthermore, the system 1 according to the disclosure comprises a remote processing unit 2, which is adapted to manage a central data bank 3. This data bank 3 contains information related to the transportable containers 100 and to their association with the corresponding identification codes (i.e., the data bank 3 contains the information related to which container 100 is associated with each identification code, and vice versa).

The unit 2, a term with which in practice it is possible to reference any entity assigned directly or indirectly to the provision and the updating of the data bank 3 (and enabled to enter or retrieve information), can typically be a company server, controlled by the company that manufactures the containers 100 and which indeed offers a service of advanced interaction with its own containers 100 by means of the system 1 according to the disclosure.

More generically, in the continuation the term "unit 2" is understood to reference both the company that manufactures or in any case wishes to enter in the data bank 3 the information related to the containers 100 by means of an appropriate software interface, and the server or other entity which is in any case assigned to the management of the data bank 3, in any case under the control anyway of the company mentioned above.

Indeed due to its role of control and management of the data bank 3, and in general of the system 1 according to the disclosure, hereinafter the manufacturing company will be referenced several times as "managing company".

It is specified that the interface by means of which the unit 2 (the personnel of the managing company) can interact with the data bank 3 can be for example a web portal, site or platform.

In any case, other embodiments of the system 1, which provide for other types of unit 2, are not excluded.

The container 100 can be provided with an additional UHF or RFID tag for use for logistical purposes, and therefore for example to facilitate the gathering of information regarding traceability, to be then transferred into the data bank 3.

Furthermore, the system 1 according to the disclosure comprises a software application 10 adapted to be run on a mobile device 4, such as a mobile phone, a smartphone, a tablet, and the like (such as for example the devices 4 known by the English terms "smart glass" "smart watch", et cetera).

The software application 10 can be for example made available online (for free or at a preset price) on a specific site of the managing company or in virtual stores such as the ones managed by the company Google® ("Google play") or Apple® ("App Store").

The software application 10 comprises at least one module 11 for polling the transponders 101, which is configured at least to acquire the respective identification code. In the preferred solution, each transponder 101 is an NFC transponder and therefore the polling module 11 can be based on the NFC functions that are normally installed in modern smartphones (or other mobile devices 4). If the contactless information transmission technology on which the transponder 101 is based is of another type, for example RFID, the polling module 11 can comprise, in addition to software instructions, also a hardware component to be integrated in the mobile device 4 (or in any case to be associated with it).

Furthermore, the software application 10 comprises at least one transceiver module 12, which is configured to establish a communication with the data bank 3 and/or the unit 2, so as to perform at least the exchange of information related to the container 100 that corresponds to the identification code acquired by the polling module 11.

Typically, the transceiver module 12 places the device 4 and the application 10 in direct contact with the data bank 3, so as to access at least some of the information contained in the data bank 3, making it available to a user A, who owns the device 4 (and the container 100). As a function of the specific requirements, however, the transceiver module 12 can make the device 4 and the application 10 communicate directly with the unit 2, bypassing the data bank 3.

Preferably but not exclusively, the transceiver module 12 uses the data transfer service by means of a connection to the Internet, which is normally provided in many commercially available mobile devices 4, as well as the other transmission methods that are normally integrated in commercially available mobile devices 4.

In summary, it can be seen that the system 1 provides for a plurality of containers 100, a unit 2, the central data bank 3 managed by the unit 2, a software application 10 and optionally one or more mobile devices 4.

As is evident to any person skilled in the art, a system 1 is provided which comprises, in addition to the containers 100, the unit 2 and the data bank 3, at least one mobile device 4, which is provided with the application 10.

In an embodiment of considerable practical interest, the software application 10 comprises a user registration module 13, which is first of all configured to request the entry of data related to a user A. In this manner, by providing data such as name and surname, date of birth, place of residence, age, gender or any other element deemed useful by the managing company, said company can have an overview of its customers, which is obviously useful to know them in the best possible way and therefore better focus its production (and to launch targeted initiatives). These data can be sent to the data bank 3 or directly to the unit 2 by means of the transceiver module 12 and preferably only after having submitted to the user A a privacy notice and the rules on data processing (or in any case after complying with the applicable statutory provisions in this regard).

Furthermore, the user registration module 13 is configured to determine the association between a specific container 100, identified by the corresponding identification code acquired by the polling module 11, and the respective registered user A.

Provisions are made to give the user A the possibility to deregister himself/herself or in any case remove the association with a container 100 of which he/she previously polled the transponder 101.

Preferably, the user registration module 13 is activated upon the first access to the application 10, so as to start immediately the registration procedure of the user A and the association with a specific container 100 (the one he/she purchased or in any case he/she uses).

Accordingly, by using the polling module 11 to poll the transponder 101 and recognize the identification code of his/her own container 100, and by virtue of the association thus provided, by means of the application 10, the user A can access the information, contained in the data bank 3, that relates indeed to his/her container 100. It is specified that the possibility is provided to associate with the same user A two or more containers 100.

It should be noted that the software application 10 can provide a login functionality, by means of which previously registered users A can be qualified as such simply by entering a user name and/or a password, and therefore even without having to poll every time the transponder 101 of their own container 100.

In particular, the information contained in the central data bank 3 can be referred to a respective container 100 and/or to a model of said containers 100 (if a series of information is common to all the containers 100 of the same model) and/or to a range of said containers 100 (if a series of information items is common to all the containers 100 of the same range).

This information (made available to the user A in the form of text, images, documents of the PDF type, or others) can be chosen among technical specifications, bills of materials, materials, traceability, results of tests conducted, certifications, manuals, operating and/or maintenance instructions, warranty terms, and the like.

Obviously, as already shown, the data bank 3 also contains the information related to the association between each container 100 and the respective identification code.

In practice, therefore, the managing company can enter in the data bank 3 a large quantity of information regarding its own containers 100 (typically, by accessing the web portal that acts as an interface with the data bank 3), so as to make them available to each user A, even at a later time.

This information can provide information on the generic model or range of container 100 (technical specifications, bills of materials, materials, certifications, manuals, operating and/or maintenance instructions, warranty terms, etc.) or can be loaded in each instance during or at the end of production and can be referred to a specific container 100 (or specific batch), since they relate only to the latter (consider reference numbers, traceability and logistics, results of tests conducted, production reports, pairing of serial number for counterfeit prevention, et cetera).

The software application 10 therefore allows the user A to receive from the central data bank 3 information on the container 100 that he/she has purchased.

The software application 10 can also allow a flow of information in the opposite direction.

First of all, in fact, the software application 10 can preferably send to the data bank 3 and/or to the unit 2 the data of the user A (as already shown) and any association between containers 100 and users A (moreover, the possibility to transfer into the data bank 3 this information even without resorting to the application 10, for example by means of the interface provided to the managing company and/or by means of the unit 2, is provided).

Favorably, the software application 10 comprises a request module 14, which cooperates with the transceiver module 12 and is configured to send to the data bank 3 and/or directly to the unit 2 requests on the part of a user A for assistance and/or spare parts (or any other communication or feedback).

Usefully, the software application 10 comprises an image acquisition module 15, which is configured to provide the connection (of the application 10 itself) to a camera which is included in the mobile device 4. The image acquisition module 15 is furthermore configured to acquire (store and/or manage) photographs, taken indeed with the device 4 and its camera and related to the respective container 100 and/or to its content.

Storage can occur locally, directly on the mobile device 4, or preferably remotely, and therefore for example in the data bank 3 and/or on the server that manages it.

Advantageously, the transceiver module 12 is configured to provide the data bank 3 and/or the unit 2 with the photographs acquired by means of the image acquisition module 15. The latter can for example cooperate with the request module 14 in order to allow the user A to attach to his request for assistance or spare parts one or more photographs of the container 100 (to document the nature of his/her requirement, for example the damaged part that must be replaced).

Usefully, the software application 10 comprises a content recording module 16, which is configured to receive and store information and/or photographs related to the respective container 100 and/or to its content, preferably associating automatically with it the entry date/time. In order to be able to store photographs, preferably the content recording module 16 cooperates with the image acquisition module 15.

The information and/or the photographs thus stored in practice define a corresponding setup, which can thus be retrieved at a later time by means of the application 10 or can in any case be kept available for other uses.

As already described for the image acquisition module 15, storage of the setup can occur locally, directly on the mobile device 4, or preferably remotely, and therefore for example in the data bank 3 and/or on the server that manages it.

The setup can be specified by the user A by entering one by one the objects, accessories, tools (or others) that are present, or by choosing them from an appropriate list, which can be supplied with the application 10 (and optionally updated remotely by the unit 2) and/or loaded/managed/modified by the user A himself/herself.

Preferably, in any case, a setup is composed of a list of objects and accessories (indeed accommodated in the container 100) and of one or more photographs (of the objects and/or of the container 100).

By means of the content recording module 16 it is possible to store a number at will of setups, and the application 10 is configured to recognize automatically the last stored setup as the "active" one, which corresponds to the current state of the container 100. The other setups in any case remain in memory for any future uses.

The content recording module 16 can also be provided with a verification function, of the checklist type, which can be operated on command by the user A: by retrieving the last stored setup, with this function the application 10 displays one by one the objects comprised therein, asking the user A to check the actual presence thereof and allowing him/her to check the match between the stored setup and the actual status of the container 100.

First of all, therefore, the content recording module 16 allows to store a "snapshot" of what is accommodated in the container 100 (a specific setup thereof). This can perform a plurality of tasks, and for example can allow to view/remember what was placed in the container 100 without having to open it (or when the container 100 is no longer within one's availability).

In an embodiment of considerable practical interest, mentioned by way of nonlimiting example of the disclosure, the content recording module 16 contains instructions to associate a setup with an informatic sealing code, which in turn corresponds to a physical seal applied to the respective container 100. The sealing code can be for example an alphanumeric string, which is also provided on the physical seal (for example a cable, a lace, or the like, arranged so as to close the container 100). In this manner, in case for example of transfer of the container 100, a first subject/user A can associate the sealing code with the setup with which he/she is about to ship the sealed container 100. A second subject/user A who receives the container 100 can have the assurance that, if he/she sees the physical seal intact, the container 100 accommodates exactly the objects and in general the setup stored by the first subject/user A as corresponding to the given sealing code. The second subject/user A can thus open the container 100 or contact the person who shipped it in order to have indications on how to open it.

The possibility is provided to associate two or more sealing codes, which correspond for example to different physical seals applied to the container 100.

Positively, the software application 10 comprises a location module 17, which is associated with the polling module 11 and is configured for connection to a geolocation apparatus (for example of the GPS type) comprised in the mobile device 4.

The location module 17 is configured to acquire, following the polling of a transponder 101, the information related to the location of the respective mobile device 4, which obviously corresponds to the information of the container 100 associated with the identification code acquired by the polling module 11.

As a function of the specific requirements, the possibility is provided to activate the location module 17 even without having to acquire the identification code from the transponder 101, for example simply by operating a command made available by the application 10.

However, by constraining the acquisition of location information to the polling of the transponder 101 it is possible to obtain greater and more interesting functionalities.

In this manner it is in fact possible to have the assurance that the location acquired by the device 4 actually corresponds to the location of the container 100, and this ensures the traceability of the movements of the latter, which are useful for third parties who wish to check and control the movements of the user A.

In fact, first of all the location module 17 can provide said user A himself/herself with the acquired information, but it is usefully configured to provide remotely, by means of the transceiver module 12, the information related to the location of the respective container 100. This information can in fact be sent to the data bank 3 and/or to the unit 2 and/or to a further superuser.

The superuser can in fact be a further company (different from the managing company) which manages and employs one or more users A (technicians, maintenance engineers, etc.): in this field, the location module 17 allows said user A to communicate in a practical manner his/her own movements, ensuring practical methods for monitoring one's own activities.

For this purpose, the superuser can be given a (limited) mode of access to the data bank 3 and/or to the unit 2, if the location module 17 transmits to them its own data, or it is possible to provide access to a mini-site or other remote administrator/virtual entity, where indeed the information collected by the location module 17 gathers.

It should be noted that the system 1 can provide for giving the managing company and/or each superuser (preferably by means of the interface with which it normally interacts with the data bank 3 and/or the application 10) the possibility to associate each employee (a respective user A) with a corresponding container 100. As an alternative or as a complement, the application 10 can be provided with a dedicated functionality for performing this last activity.

Indeed to further facilitate the methods for monitoring and verifying the activities of the user A who uses a container 100, the application 10 is usefully comprises a reporting module 18, which is associated with the polling module 11 and/or with the transceiver module 12 and/or with the image acquisition module 15 and/or with the content recording module 16 and/or with the location module 17 (or others still), in order to access the information acquired by them and optionally share it.

The reporting module 18 is in fact configured to generate and share documents which bear information related at least to the respective container 100 and/or to its movements and/or to the movements of the corresponding user A. These documents can also be useful to generate, at the end of the day or at any time, intervention reports with which to prepare invoices and expense reports.

These documents can thus be transmitted to the managing company or to a superuser, for which the user A works, or can be used by the latter in his/her work.

In this context, preferably the location module 17 and/or the content recording module 16 (or others still) must be activated both at the beginning and at the end of each intervention, in order to document easily its duration and any other associated relevant information.

The document generated by the reporting module 18 can optionally be provided on the basis of a template previously saved and stored in the application 10 (even by the user A).

It should be noted that the location module 17 and the reporting module 18 (and in general the application 10) are of considerable interest when a superuser wishes to check and report in a practical manner the activities of his/her employees (users A), but offer practical methods of self-management and self-verification of one's own work to users A who, working autonomously in any case in a professional context, wish to track their own activities and their own intervention times in a practical and easy manner.

Advantageously, the software application 10 comprises a search module 19, which is associated with the polling module 11 and is configured to search in the surrounding environment for a specific container 100 and/or a specific setup stored previously, and to send at least one notification upon their detection.

By indicating by means of the application 10 the container 100 or the setup of interest (or even a specific object comprised in a setup), the application 10 is in fact provided with instructions to identify and search for the identification code of the corresponding container 100.

More precisely, the user A can move his own device 4 closer to one by one of the containers 100 in the surrounding environment, and in the meantime, with the activation of the search module 19, the polling module 11 polls every transponder 101, searching for the identification code of interest. When the desired container 100 is identified, the search module 19 can thus notify the user A in various manners, for example by means of the device 4 and by means of acoustic, visual signals (a red/green traffic light or other icons displayed on the display of the device 4) or a vibration.

The search module 19 thus turns out to be of unquestionable interest in order to identify a specific container 100 (the one of the user A, for example, which corresponds to the identification code being searched for) within a mass of identical containers 100 (for example in a warehouse, in a hold, or others still) and/or in order to identify the setup/object of interest, among many containers 100, without having to open them one by one.

If the user A who at that moment is using the application 10 is qualified as superuser (or managing company), the search module 19 can be configured to identify the container 100 associated with a specific user A.

Conveniently, in an embodiment of considerable practical interest, which in any case does not limit the disclosure, each container 100 is provided with a further unique identification means, which is constituted (preferably but not exclusively) by a QR code 102, which is applied for example to an external surface of the container 100 itself, or on an additional tag that is fixed thereto.

In a manner which can also be known, and for example by means of an enabled smartphone, said QR code 102 can be polled in order to establish a communication between the current owner of the container 100 and a user A previously registered as its owner.

The owner qualification would have been acquired previously, for example with the user registration module 13.

The ways in which the current owner of the container 100 is enabled to communicate with the user A registered previously can be different, and for example can provide for access to a mini-site and/or the download of an additional software, capable of sending a notification to the application 10.

Preferably, in any case, the reading of the QR code 102 activates the download of the software application 10 itself, which is thus provided with an additional functionality, which is accessible to unregistered individuals (such as indeed the person who has found the container 100) to indeed communicate the finding to the legitimate owner.

The software application 10 is thus provided with a finding module 20, which is indeed configured to receive a notification (textual, acoustic, graphical, tactile, or others) upon reading of the respective QR code 102.

The user A who lost his own container 100 can thus be informed when someone else has found it (has read its QR code 102) and it is thus possible to establish a communication between the two in order to agree on the manner of restitution.

The software application 10 can further provide for the possibility to record a predefined message (with indications to return the container, one's own reference information, the promise of a reward, or others still) which is viewed by the person who finds the container 100 and has read its QR code 102.

It is useful to specify that it is possible to associate with each one of the modules 11, 12, 13, 14, 15, 16, 17, 18, 19, 20 a respective function of the application 10, which can be activated by means of a respective button and/or can be accessed from a respective menu, which are in any case made available on the device 4 by the interface of the application 10 itself.

In addition to the system 1 described in the preceding pages, the present description also relates to a software application 10 for advanced interaction with transportable containers 100, such as suitcases, trolleys, trunks, backpacks, crates, or the like. This software application 10 is indeed adapted to be run on a mobile device 4 and is comprised in the system 1 described so far.

According to the disclosure, therefore, this application 10 comprises at least one polling module 11 for the transponders 101, which is configured at least to acquire the respective identification code, and at least one transceiver module 12, which is configured to establish a communication with the data bank 3 and/or the unit 2 of the system 1, at least the exchange of information related to the container 100 that corresponds to the identification code acquired by the polling module 11.

The software application 10, illustrated schematically in a possible embodiment in FIG. 2 and considered a specific subject matter of the disclosure like the system 1, can be provided (in any combination) with one or more of the modules 11, 12, 13, 14, 15, 16, 17, 18, 19, 20 and/or of the functionalities described in the preceding pages.

In addition to the system 1 and to the software application 10, a method of advanced interaction with transportable containers 100 is provided, of the type of suitcases, trolleys, trunks, backpacks, crates, or the like. The accompanying FIG. 3 shows schematically a possible embodiment of this method.

According to the disclosure, the method includes providing, in a step a., a plurality of transportable containers 100.

The method also provides, in a step b., for equipping each container 100 with a respective transponder 101, which carries at least one corresponding identification code. Each transponder 101 can be polled by means of a contactless information transmission technology, such as RFID, NFC, or similar technologies, for the communication at least of the corresponding identification code.

The method also includes, in a step c. (even partially simultaneous/previous with respect to the preceding ones), providing a central data bank 3 which contains information related to the transportable containers 100 and to their association with the corresponding identification codes.

The method then provides, in a step d. which is also partially simultaneous/previous with respect to the preceding ones, for providing at least one software application 10 which is adapted to be run on a mobile device 4, such as a cellular telephone, a smartphone, a tablet, and the like. Step d. can provide, in a fully equivalent manner, for providing a mobile device 4 equipped with a software application 10.

The application 10 comprises at least one module 11 for polling the transponders 101, which is configured at least to acquire the respective identification code. Furthermore, the application 10 comprises at least one transceiver module 12, which is configured to establish a communication with the data bank 3 and/or a unit 2 adapted to manage the data bank 3 itself, at least to allow the exchange of information related to the container 100 that corresponds to the identification code acquired by the polling module 11.

The embodiment of the method according to the disclosure, which can be performed by resorting to the system 1 and/or to the application 10, can provide for the specifications of the preceding pages (in any combination) and therefore, for example, the application 10 can be provided with one or more of the modules 11, 12, 13, 14, 15, 16, 17, 18, 19, 20 described indeed in the preceding pages.

The use of the system and of the application according to the disclosure, as well as the execution of the method according to the is disclosure, is therefore evident from what has been described so far.

The user A who has purchased a container 100 comprised within the system 1 can use a plurality of interesting functions, simply by downloading onto his/her own mobile device 4 the software application 10.

First of all, in fact, after taking care of registration and after polling for the first time the transponder 101 on his/her own container 100, in order to acquire its identification code (by means of the polling module 11 and the user registration module 13), he/she can access the information related to his/her container 100 that is contained in the central data bank 3 and entered by the managing company or by who, on behalf of the latter, manages the unit 2.

The flow of information established by the application 10, however, is not directed exclusively toward the user A: as shown, the request module 14 allows the latter to send to the managing company important indications, such as reports of faults or defects and/or the need for spare parts.

This request can be accompanied by photographs of the product/part of interest and/or of the observed technical problem, by virtue of the image acquisition module 15, and this obviously ensures the completeness of the request, facilitating its fulfillment.

In this regard, it should be noted that preferably the managing company is given the option to access and constantly update the data bank 3 (for example by means of a service of the "customer care" type), for example in order to react promptly to indications from the market (from the users A) and initiate corrective actions, publish new instructions which explain how to correct a reported problem, with the application 10 which is also provided with instructions in order to report to the user A, upon the next access and/or by means of an independent notification, that important changes in the information have occurred, for those obviously who own a container 100 that is involved.

The system 1 and/or the software application 10 and/or the method according to the disclosure therefore allow practical methods of information exchange between a user A, who owns a container 100, and the managing company (or in any case the unit 2).

User registration also allows the managing company to start initiatives targeted to the users A, since it allows to gather information regarding them and therefore to define in the best way the reference customers of the company, identifying their needs in the best possible way.

By utilizing the various functionalities of the application 10 in ever different manners, it is possible to provide numerous and interesting promotional campaigns or direct marketing initiatives, even by leveraging social networks.

For example, by virtue of the location module 17, it is possible to organize contests in order to reward the users A who poll the transponder 101 of their own container 100 in the largest number of different points on the globe, generating audience in social networks.

Furthermore, the marketing office of the managing company can initiate loyalty programs, providing for example previously registered users A with access to a dedicated online sales site, in which one can find items, merchandising accessories of various kinds, which preferably in any case do not belong to the marketed standard range, so as to not interfere with the distribution and retailer network.

By means of the management interface (web portal, for example), it is possible to give the managing company (its marketing office) the possibility to send messages (promotional or of another kind) to all the users A or only to some of them (because they own the same model of container 100 or because they are located in the same geographical area, for example). Thus, the user A can be informed of the availability of a new accessory for his/her container 100 or of the presence of a new initiative/promotion which involves the very geographical area to which he/she belongs.

It should be noted, in this regard, that by means of an appropriate interface, access to the data bank 3 for the employees of the managing company or in any case the exchange of information with the users A can be provided/allowed in a diversified manner as a function of the role of the employee.

Some employees in fact might be assigned to transferring the production/logistic information on the containers 100, others to the management of the requests for assistance, still others to marketing actions, etc., therefore being enabled to different functions of the interface and/or different methods of using the system 1.

Vice versa, as already anticipated briefly in the preceding pages, in one possible manner of embodiment of the application 10 it can provide some users A with the possibility to qualify themselves as superusers and/or as managing company (by means of an appropriate dedicated procedure), thus having available at least some of the functions normally provided for the (web) interface for management of the data bank 3.

The search module 19 facilitates the identification of a specific container 100 or setup of interest: the user A must simply move his/her own device 4 closer to the transponders 101 of the containers 100 that are present in the same area and wait for a notification, confirming the detection of the identification code associated with the container 100 or setup (or specific object) that is being searched.

The finding module 20 indeed facilitates the finding and return of a lost container 100, starting from the preceding polling of the QR code 102 on the part of another individual, who found said container 100.

It has furthermore been shown that the reporting module 18, the content recording module 16 and/or the location module 17, optionally cooperating with the image acquisition module 15, offer additional practical functionalities.

Among these, there is first of all the possibility to store information related to the setup and the objects of the container 100, at a specific time and/or in a specific place (also recorded). This obviously allows to retrieve this information even at a later time without having to reopen the container 100.

Thus, the system 1 and/or the software application 10 and/or the method according to the disclosure facilitate the gathering and exchange of information related to what is accommodated in the container 100.

Moreover, this information can be processed by the reporting module 18, which generates documents and reports that are useful for the user A himself, also to write invoices and expense reports, as well as for a superuser for whom he/she works and performs his/her own professional activity.

The latter can be given access to a limited version of the data bank 3 or preferably to a mini-site or other remote administrator/virtual entity, optionally with an additional dedicated application or with a customized version of the application 10, in order to check even in real time the location of the fleet of technicians and the status of the activities in progress.

Thus, the application 10 allows to record movements and technical interventions and the geolocation during the beginning/resumption and at the end/interruption of intervention (activating in each instance the polling module 11 in order to "read" the transponder 101), allowing the entry of additional information, such as the reference data of the customer where the intervention took place.

The application 10 thus facilitates the gathering and exchange of information related to the activities of the user A.

It should be noted that provisions are made for providing transponders 101 capable of receiving additional data, as well as applications 10 enabled also for writing: thus, any information previously acquired by the application 10 itself, for example by means of the user registration module 13, the image acquisition module 15, the content recording module 16, the location module 17, the reporting module 18, or others, can be transferred directly onto the transponder 101 itself, so as to make it easily available in the future, and also to another user A, who is to gain possession of the same container 100 at a later time.

It should be noted that the user A can be the final buyer of the container 100 but can also be a distributor who uses the functionalities of the application 10 to exchange useful information with the managing company, for example in order to track restocking orders and for their shipping, for the periodic reporting of the status of the warehouse, in order to allow automatic restocking and in general the management of reserves optionally by means of dedicated software (to be interfaced with the application 10).

Finally, it should be noted that the system 1 can ensure practical functionalities even to an additional third company (among large retailers) that purchases containers 100 from the managing company and sells them in turn to its own customers. In this case, in fact, the application can be configured to make these customers (additional users A) communicate directly not only with the managing company but also with said third-party company, which in turn therefore is provided with a portal for access and (partial) management of the data bank 3. In this case, moreover, provisions are made for providing a sort of partitioning of the data bank 3 itself, so that the management company and the third-party company cannot share information that is by nature confidential, such as information related to the respective customers, but have access to distinct and protected data.

The disclosure thus conceived is susceptible of numerous modifications and variations, all of which are within the scope of the appended claims; all the details may furthermore be replaced with other technically equivalent elements.

In the exemplary embodiments shown, individual characteristics, given in relation to specific examples, may actually be interchanged with other different characteristics that exist in other exemplary embodiments.

In practice, the materials used, as well as the dimensions, may be any according to the requirements and the state of the art.

The invention claimed:

1. A system of advanced interaction with transportable containers, such as suitcases, trolleys, trunks, backpacks, or crates, the system comprising:
    a plurality of transportable containers, each one of said containers being equipped with a respective transponder which carries at least one corresponding identification code, each one of said transponders allowing polling by means of a contactless information transmission technology, such as RFID, NFC, or similar technologies, for communication at least of the corresponding said identification code;
    a remote processing unit, suitable for the management of a central data bank, which contains information related to said transportable containers and to their association with the corresponding said identification codes;
    a mobile device, and a camera included in the mobile device, and
    a software application running on said mobile device, said application comprising at least one polling module for polling said transponders, which is configured at least to acquire the respective said identification code, and at least one transceiver module, configured to establish a communication with said data bank and/or said unit, at least for the exchange of information related to said container that corresponds to the identification code acquired by said polling module, said software application comprising an image acquisition module configured for connection to said camera and adapted for acquiring photographs by said camera of specific content arranged inside said container, said software application further comprising a content recording module configured to receive and store said photographs of said specific content arranged inside said container, which define a corresponding setup of said specific content arranged inside said container, said setup stored in said content recording module being retrievable at a later time by said software application.

2. The system according to claim 1, wherein said software application comprises a user registration module configured for entry of data related to a user and an association between a specific said container, identified by the corresponding said identification code required by said polling module, and a respective registered user.

3. The system according to claim 1, wherein said information contained in said central data bank relates to a respective said container and/or to a model of said containers and/or to a range of said containers, and are chosen among technical specifications, bills of materials, materials, traceability, results of tests conducted, certifications, manuals, operating and/or maintenance instructions, and warranty terms.

4. The system according to claim 1, wherein said transceiver module is configured to provide said data bank and/or said unit with said photographs acquired with said image acquisition module.

5. The system according to claim 1, wherein said content recording module is further configured to receive and store information and/or photographs related to the respective said container, which further define said corresponding setup.

6. The system according to claim 5, wherein said content recording module contains instructions for associating a said setup with an informatic sealing code, which in turn corresponds to a physical seal applied to said respective container.

7. The system according to claim 1, wherein said software application comprises a location module associated with said polling module and configured for connection to a geolocation apparatus comprised within the mobile device, said location module being configured to acquire, following the polling of a said transponder, information related to the location of the respective mobile device which corresponds to the location of said container associated with said identification code acquired by said polling module.

8. The system according to claim 7, wherein said location module is configured to provide remotely, using said transceiver module, said information related to the location of the respective said container.

9. The system according to claim 1, wherein said software application comprises a reporting module, associated with said polling module and/or with said transceiver module and/or with said image acquisition module and/or with said content recording module and/or with said location module, said reporting module being configured for the generation and sharing of documents which bear information related at least to the respective said container and/or to its movements and/or to the movements of the corresponding user.

10. The system according to claim 1, wherein said software application comprises a search module, which is associated with said polling module and is configured to search in a surrounding environment for a specific said container and/or for a specific said setup which have been stored previously, and to send at least one notification upon their detection.

11. The system according to claim 1, wherein each one of said containers is provided with an additional identification means, constituted by a QR code, configured to be polled to establish communication between the current owner of said container and a user previously registered as its owner, said software application being provided with a finding module configured to receive a notification upon reading of the respective said QR code.

12. A software application for advanced interaction with transportable containers, adapted to be run on a mobile device and comprised in the system according to claim 1, comprising at least one module for polling said transponders, which is configured at least to acquire the respective said identification code, and at least one transceiver module, which is configured to establish a communication with said data bank and/or said unit, at least for the exchange of information related to said container which corresponds to the identification code acquired by said polling module.

13. The system according to claim 1, wherein said software application comprises a request module, which cooperates with said transceiver module and is configured to send to said data bank and/or to said unit requests on the part of a user for assistance and/or spare parts.

14. A method of advanced interaction with transportable containers, the method including the following steps:
a. providing a plurality of transportable containers,
b. equipping each one of said containers with a respective transponder which carries at least one corresponding identification code, each one of said transponders allowing polling using a contactless information transmission technology, such as RFID, NFC, or similar technologies, for the communication at least of the corresponding said identification code,
c. providing a central data bank which contains information related to said transportable containers and to their association with the corresponding said identification codes,
d. providing a mobile device including a camera, and
e. providing at least one software application running on mobile device, said application comprising at least one module for polling said transponders, which is configured at least to acquire the respective said identification code, and at least one transceiver module, which is configured to establish a communication with said data bank and/or a unit adapted to manage said data bank, at least for the exchange of information related to said container which corresponds to the identification code acquired by the polling module, and said software application comprising an image acquisition module configured for connection to said camera and adapted for acquiring photographs by said camera of specific content arranged inside said container, said software application further comprising a-said specific content recording module configured to receive and store said photographs of a specific content arranged inside said container, which define a corresponding setup of said specific content arranged inside said container, said setup stored in said content recording module being retrievable at a later time by said software application.

* * * * *